(12) United States Patent
Lin et al.

(10) Patent No.: US 8,804,076 B2
(45) Date of Patent: Aug. 12, 2014

(54) LIQUID CRYSTAL DISPLAY DEVICE COMPRISING A LIGHT ABSORBING LAYER COVERING ALL PIXEL REGIONS TO ABSORB LIGHT HAVING WAVELENGTH BETWEEN 380 NM AND 560 NM

(75) Inventors: Chih-Pin Lin, Tainan (TW); Chao-Hui Wu, Kaohsiung (TW)

(73) Assignee: HannStar Display Corp., Wugu Dist., New Taipei (TW)

( * ) Notice: Subject to any disclaimer, the term of this patent is extended or adjusted under 35 U.S.C. 154(b) by 104 days.

(21) Appl. No.: 13/533,924

(22) Filed: Jun. 26, 2012

(65) Prior Publication Data

US 2013/0063683 A1    Mar. 14, 2013

(30) Foreign Application Priority Data

Sep. 8, 2011   (TW) .............................. 100132494 A

(51) Int. Cl.
*G02F 1/1335* (2006.01)

(52) U.S. Cl.
USPC .............................. 349/106; 349/68; 349/114

(58) Field of Classification Search
CPC ..... G09G 3/3413; G09G 3/36; G09G 3/3406; G09G 3/3607; G09G 3/3233; G09G 3/3258; G09G 2320/0666; G09G 2320/0633; G09G 2320/064; G09G 2320/0646; G09G 2310/0235; G09G 2310/0237; G09G 2300/0452; G09G 2300/0456; G09G 2300/046; G09G 2360/142; H04N 9/3197; H04N 9/3111; H04N 9/3114; H04N 9/315; H04N 13/0418; H04N 13/0422; G02B 6/0068; G02B 2027/0112; G02B 26/008; G02B 27/2264; G02F 1/135; G02F 1/133362; G02F 1/133514; G02F 1/33553; G02F 1/133621; G02F 1/1335; G02F 1/133509; G02F 1/133524; G02F 1/133603; G02F 1/13439; G02F 1/1354; G02F 1/133512; G02F 2203/12; G02F 2001/133622; H04W 52/027
USPC .......................... 345/102, 690, 87, 83, 88, 99; 257/E31.122; 348/E9.027, E13.031; 349/65, 68, 104, 108, 110, 113, 114, 349/106; 362/231, 613, 311.02, 600, 602, 362/612, 615, 97.1, 97.2
See application file for complete search history.

(56) References Cited

U.S. PATENT DOCUMENTS

| | | | |
|---|---|---|---|
| 6,466,280 B1 * | 10/2002 | Park et al. ........................ | 349/43 |
| 7,336,325 B2 * | 2/2008 | Hong ................................ | 349/61 |
| 8,004,635 B2 * | 8/2011 | Lee et al. ....................... | 349/106 |
| 2004/0239839 A1 | 12/2004 | Hong | |
| 2009/0059581 A1 * | 3/2009 | Hayashi et al. ................ | 362/234 |
| 2010/0188624 A1 | 7/2010 | Lee | |

* cited by examiner

*Primary Examiner* — Thoi Duong
(74) *Attorney, Agent, or Firm* — Winston Hsu; Scott Margo

(57) ABSTRACT

The present invention provides a liquid crystal display device including a liquid crystal panel. The liquid crystal panel has a plurality of pixel regions, and the liquid crystal panel includes a first substrate, a second substrate, a liquid crystal layer, and a light-absorbing layer. The second substrate and the first substrate are disposed opposite to each other, and the liquid crystal layer is disposed between the first substrate and the second substrate. The light-absorbing layer is disposed between the first substrate and the second substrate in the pixel regions, and the light-absorbing layer is configured to absorb a light having a wavelength within a range between 380 nm and 560 nm.

13 Claims, 4 Drawing Sheets

LIQUID CRYSTAL DISPLAY DEVICE COMPRISING A LIGHT ABSORBING LAYER COVERING ALL PIXEL REGIONS TO ABSORB LIGHT HAVING WAVELENGTH BETWEEN 380 NM AND 560 NM

BACKGROUND OF THE INVENTION

1. Field of the Invention

The present invention relates to a liquid crystal display device, and more particularly, to a field-sequential-color liquid crystal display device.

2. Description of the Prior Art

Color mixing methods in liquid crystal display devices can be divided into a space-domain color mixing method and a time-domain color mixing method. The space-domain color mixing method is widely utilized. Take a thin field transistor liquid crystal display (TFT-LCD) as an example. Each display pixel is composed of a red sub-pixel, a green sub-pixel, and a blue sub-pixel. The red sub-pixel, the green sub-pixel, and the blue sub-pixel respectively correspond to a red color filter, a green color filter, and a blue color filter. By the color mixing of the red sub-pixel, the green sub-pixel, and the blue sub-pixel of each display pixel, color displaying images can be recognized by the human visual system. The time-domain color mixing method do not require the color filter, and by means of a color sequential method, the red light, the green light, and the blue light respectively pass through the liquid crystal display panel in sequence for the color mixing. Accordingly, the human visual system can recognize the effect of the color mixing by the photogene of the human eye. As a result, a field sequential color (FSC) liquid crystal display device utilizing the time-domain color mixing method to display a colorful frame has following advantages. (1) Compared with the pixel in the conventional liquid crystal display device with the color filter being composed of a red sub-pixel, a green sub-pixel, and a blue sub-pixel, the pixel in the FSC liquid crystal display device can be reduced to improve the resolution of the liquid crystal display device, or to maintain the resolution of the liquid crystal display device with reduced cost of the thin film transistor substrate. (2) Without the color filter, the product cost of the liquid crystal display device can be reduced.

Since the FSC liquid crystal display device has no color filters, the FSC liquid crystal display device may have higher transmittance than the conventional liquid crystal display device. Accordingly, the FSC liquid crystal display device may operate in a micro reflective mode that is a condition of turning off the backlight system and being disposed in an environment with sunlight at outside. In this condition, the FSC liquid crystal display device utilizes the backlight module to reflect the sunlight to display the image, so that there is no need to dispose the reflective electrode to reflect the sunlight in the FSC liquid crystal display device. However, an energy distribution of blue-green color region is larger than the other color regions in the continuous spectrum of average sunlight D65, so that when the FSC liquid crystal display device utilizes the sunlight as a light source, that is the FSC liquid crystal display device operating in the reflective mode or the backlight system being turning off to be in the micro reflective mode, the frame easily has blue-green shift at a specific viewing angle. Through actually measurement, the color shift is more obvious when the FSC liquid crystal display device is displaying the frame with high gray level. That means the optical compensation bend liquid crystal display device easily displays the frame with color shift in the condition of the liquid crystal molecules being substantially parallel to the light exit surface of the liquid crystal panel. When the viewing angle is larger in the condition of high gray level, the color shift is more serious.

Therefore, in reflective mode or micro reflective mode, to reduce the color shift of the FSC liquid crystal display device is an objective in this field when the environment light is utilized as main light source.

SUMMARY OF THE INVENTION

It is therefore an objective of the present invention to provide a liquid crystal display device to reduce the color shift of the FSC liquid crystal display device when operating in the reflective mode or the micro reflective mode.

According to a preferred embodiment of the present invention, a liquid crystal display device is disclosed. The liquid crystal display device includes a liquid crystal panel. The liquid crystal panel has a plurality of pixel regions, and the liquid crystal panel has a plurality of pixel regions. The liquid crystal panel includes a first substrate, a second substrate, a liquid crystal layer, and a light absorption layer. The second substrate is disposed opposite to the first substrate, and the liquid crystal layer is disposed between the first substrate and the second substrate. The light absorption layer is disposed between the first substrate and the second substrate in the pixel regions, and the light absorption layer is configured to absorb a light having a wavelength within a range between 380 nm and 560 nm.

The color shift of the liquid crystal display device of the present invention could be effectively reduced when the liquid crystal display device operates in the reflective mode or the micro reflective mode through disposing the light absorption layer between the first substrate and the second substrate, changing a part of the gray levels, or turning on a part of light-emitting devices in the timing control backlight module.

These and other objectives of the present invention will no doubt become obvious to those of ordinary skill in the art after reading the following detailed description of the preferred embodiment that is illustrated in the various figures and drawings.

DETAILED DESCRIPTION

In the following description, numerous specific details are given to provide a thorough understanding of the invention. It will, however, be apparent to one skilled in the art, that the invention may be practiced without these specific details. Furthermore, some well-known system configurations and process steps are not disclosed in detail, as these should be well-known to those skilled in the art.

Figure 1:
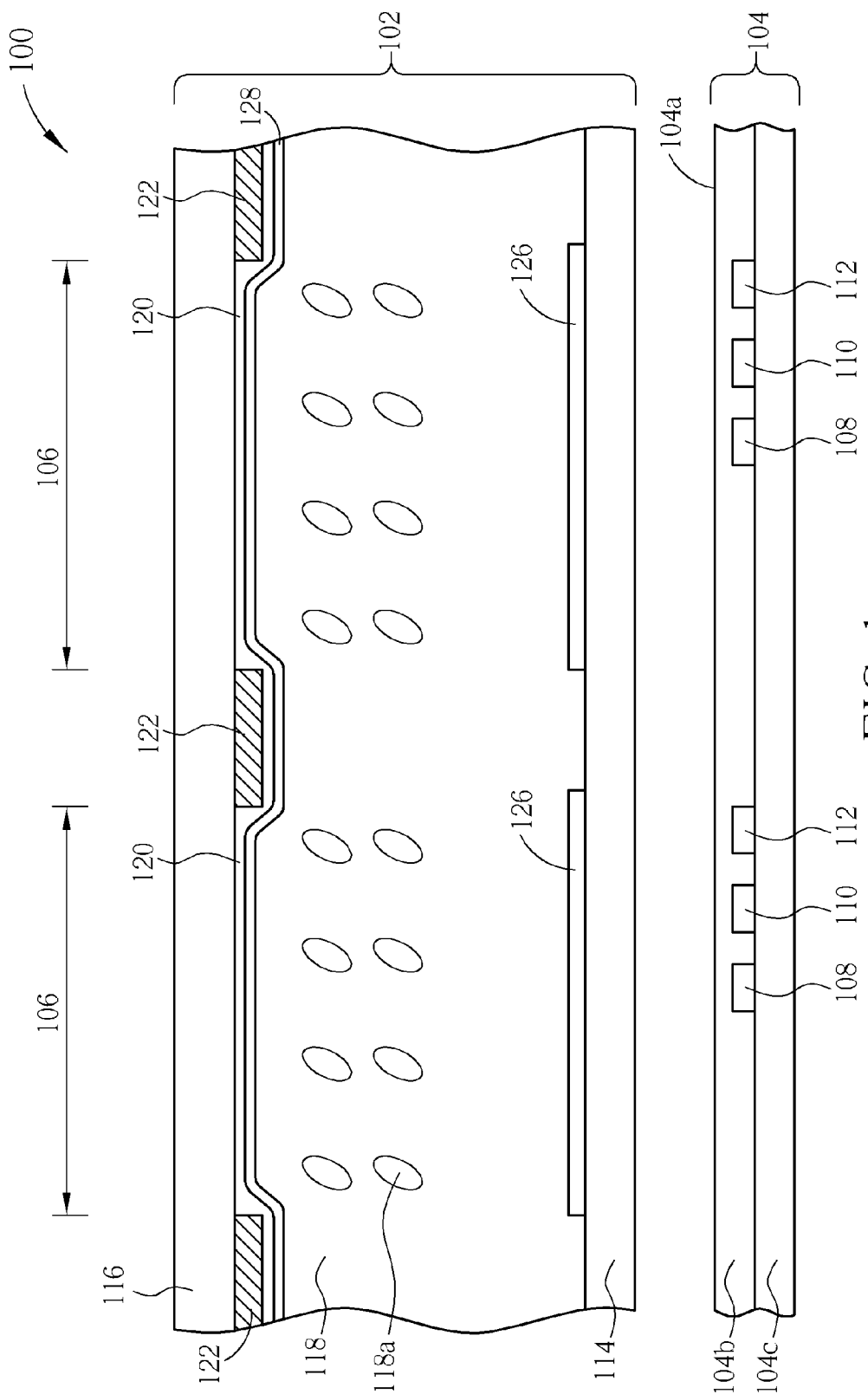
FIG. 1 is a schematic diagram illustrating a cross-sectional view of a liquid crystal display device according to a first preferred embodiment of the present invention.

Please refer to FIG. 1, which is a schematic diagram illustrating a cross-sectional view of a liquid crystal display device according to a first preferred embodiment of the present invention. As shown in FIG. 1, the liquid crystal display device 100 includes a liquid crystal panel 102, and a timing control backlight module 104. The timing control backlight module 104 has a light exit surface 104a, and the liquid crystal panel 102 is disposed on the light exit surface 104a. The timing control backlight module 104 is configured to provide lights with different color in different time periods according to a specific timing sequence. In other words, the timing control backlight module 104 in the present invention sequentially provides backlights with different colors during an extremely short time by utilizing a color sequential method so as to replace the conventional space-domain color mixing method with the time-domain color mixing method. Accordingly, the liquid crystal panel 102 doesn't require the color filters with different colors to mixing lights with different colors, and expensive cost of the color filters configured to mixing colors can be saved. For this reason, the liquid crystal display device 100 is a field sequential color (FSC) liquid crystal display device. In addition, the liquid crystal panel 102 has a plurality of pixel regions 106, and each pixel region 106 is a transmissive region. Thus, the liquid crystal panel 102 is a transmissive liquid crystal panel. Each pixel region 106 is not composed of a plurality of sub-pixel regions, and each pixel region 106 itself can provide red frame, green frame and blue frame in different time periods that are in harmony with the time sequence of the timing control backlight module 104. In this embodiment, the timing control backlight module 104 is a direct-type backlight module, and includes at least one first light-emitting device 108 configured to provide a first color light, at least one second light-emitting device 110 configured to provide a second color light, at least one third light-emitting device 112 configured to provide a third color light, a light guide plate 104b, and a reflective plate 104c. The first light-emitting device 108, the second light-emitting device 110 and the third light-emitting device 112 are disposed under the light guide plate 104b, and the reflective plate 104c is disposed under the light guide plate 104b, the first light-emitting device 108, the second light-emitting device 110 and the third light-emitting device 112 and configured to reflect light. The first light-emitting device 108, the second light-emitting device 110 and the third light-emitting device 112 can be light-emitting diodes configured to generate different color lights, such as red light-emitting diode, green light-emitting diode and blue light-emitting diode, but the present invention is not limited thereto. The first light-emitting device, the second light-emitting device and the third light-emitting device in the present invention also can be other light-emitting devices that can generate different color lights. In other embodiments of the present invention, the reflective plate also can be a reflective film. The timing control backlight module also can be an edge type.

In addition, the liquid crystal panel 102 includes a first substrate 114, a second substrate 116, a liquid crystal layer 118, and a light absorption layer 120. The first substrate 114 and the second substrate 116 are disposed opposite to each other, and the first substrate is disposed between the timing control backlight module 104 and the second substrate 116. The liquid crystal layer 118 is disposed between the first substrate 114 and the second substrate 116, and the liquid crystal layer 118 includes a plurality of liquid crystal molecules 118a. In this embodiment, the first substrate can be an array substrate having required devices of the liquid crystal panel 102, such as scan lines, data lines, thin-film transistors, and pixel electrodes. The following description will not further detail the required devices of the liquid crystal panel 102. The second substrate 116 can be a transparent substrate, such as glass, plastic or quartz. Furthermore, the liquid crystal panel 102 of this embodiment is preferably an optical compensated bend (OCB) liquid crystal panel, which has enough response time to be in harmony with the timing control backlight module 104.

It should be noted that the light absorption layer 120 is disposed in each pixel region 106 and located between the first substrate 114 and the second substrate 116, and the light absorption layer 120 is configured to absorb light with a wavelength within a range substantially between 380 nm and 560 nm after being reflected, which is blue-green light. Accordingly when sunlight penetrates through the second substrate 116, apart of the sunlight passes through the light absorption layer 120, and a part of energy of other part of the sunlight with blue-green color can be absorbed, and the light reflected by the second substrate 116 also will pass through the light absorption layer 120 again and be absorbed by the light absorption layer 120 again. Thus, the light with wavelength between 380 nm and 560 nm can be reduced. For this reason, the light emitted out from the outside of the second substrate 116 won't be blue-greenish. In this embodiment, the light absorption layer 120 is disposed between the second substrate 116 and the liquid crystal layer 118, and covers the second substrate 116 so as to absorb a part of blue-greenish light passing through the second substrate 116. The present invention is not limited thereto, and the light absorption layer 120 in the present invention also can only cover the second substrate 116 of each pixel region 106 or a part of second substrate 116 shielding each pixel region 106. In addition, the light absorption layer 120 is composed of a color filter with one color, such as red color filter, yellow color filter, or orange color filter, but the present invention is not limited thereto.

In this embodiment, the liquid crystal panel 102 further includes a black matrix 122, a plurality of transparent electrodes 126, and a common electrode 128. The black matrix 122, which is configured to cover a part of devices in the first substrate 114, is disposed between the pixel regions 106, and the light absorption layer 120 extends to overlap the black matrix 122. Each transparent electrode 126 is disposed between the first substrate 114 and the liquid crystal layer 118 in each pixel region 106 respectively, and serves as a pixel electrode, and the light could penetrate through it. Furthermore, the common electrode 128 is disposed between the light absorption layer 120 and the liquid crystal layer 118, but the present invention is not limited herein. In other embodiments of the present invention, the common electrode could be disposed between light absorption layer 120 and the second substrate 116.

As the above-mentioned description, when the timing control backlight module 104 is turned off to make the liquid crystal display device 100 operates in a micro reflective mode in this embodiment, an ambient light could penetrate through the liquid crystal panel 102 and the light guide plate 104b, and then is reflected by a reflective plate 104c so as to be a light source of the liquid crystal display device 100, and the liquid crystal display device 100 could display a frame. It should be noted that the liquid crystal display device 100 could filter a part of the blue light and a part of the green light so as to reduce color shift of the frame displayed by the liquid crystal display device 100 through disposing the light absorption layer 120 between the second substrate 116 and the liquid crystal layer 118, and the liquid crystal display device 100 could display a normal frame.

Figure 2:
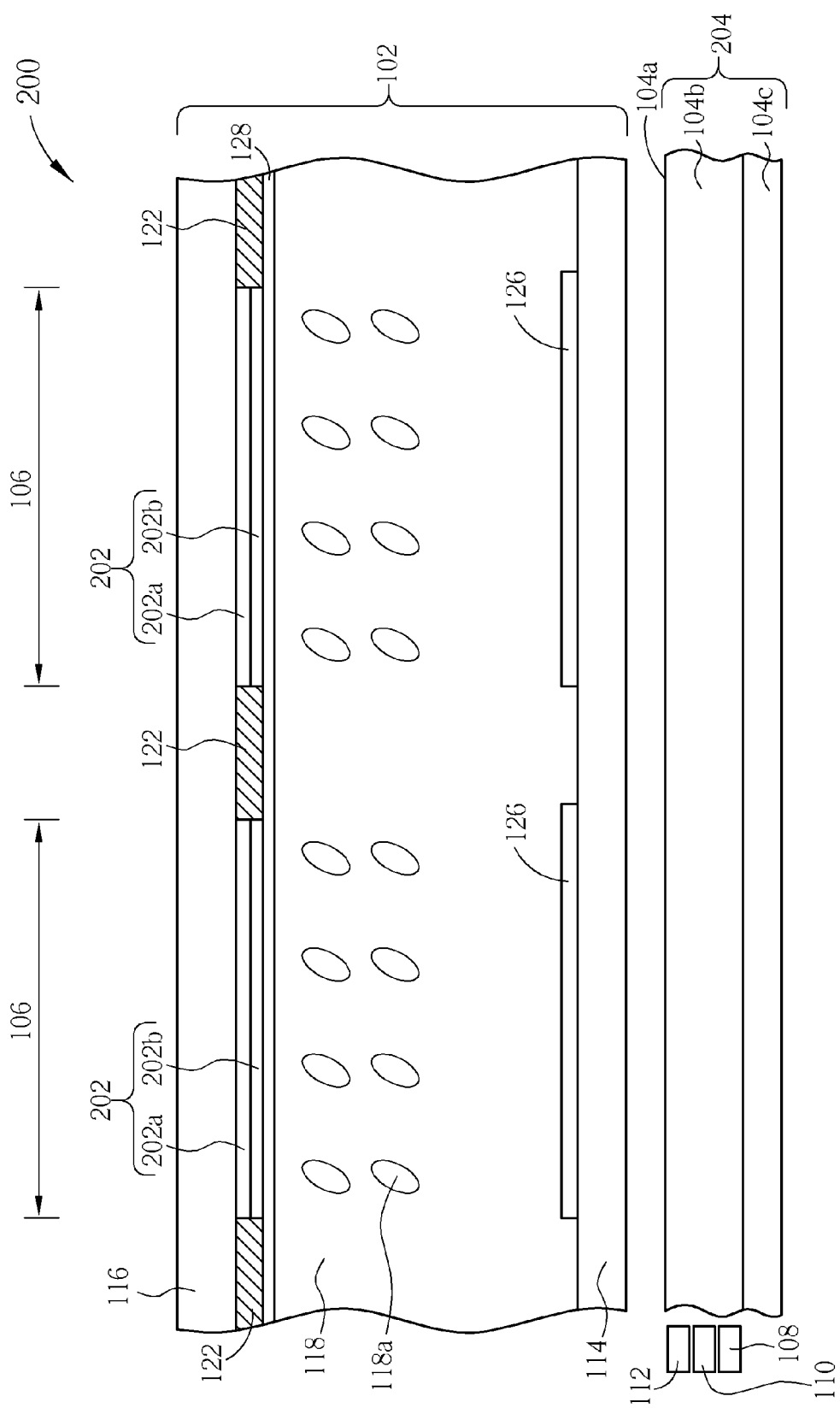
FIG. 2 is a schematic diagram illustrating a cross-sectional view of a liquid crystal display device according to a second preferred embodiment of the present invention.

The light absorption layer in the present invention is not limited to be composed by only one color filter layer, and also could be composed of a stack of a plurality of color filters. In addition, in order to simplify and show the difference between the other embodiments or modifications and the above-mentioned embodiment, the same numerals denote the same components in the following description, and the same parts are not detailed redundantly. Please refer to FIG. 2, which is a schematic diagram illustrating a cross-sectional view of a liquid crystal display device according to a second preferred embodiment of the present invention. As shown in FIG. 2, as compared with the first embodiment, the light absorption layer 202 in the liquid crystal display device 200 of this embodiment includes a first color filter 202a and a second color filter 202b, and the timing control backlight module 204 is a side light type backlight module. The first color filter 202a that has a first color and the second color filter 202b that has a second color are stacked between the second substrate 116 and the liquid crystal layer 118, and a mixing of the first color and the second color could absorb light having a wavelength within a range between 380 nm and 560 nm. In this embodiment, the first color is red, and the second color is blue, and the first light-emitting device 108, the second light-emitting device 110 and the third light-emitting device 112 are disposed at a side of the light guide plate 104b, but are not under the light guide plate 104b. In other embodiments of the present invention, the first color and the second color also could be exchanged, or be other colors.

Figure 3:
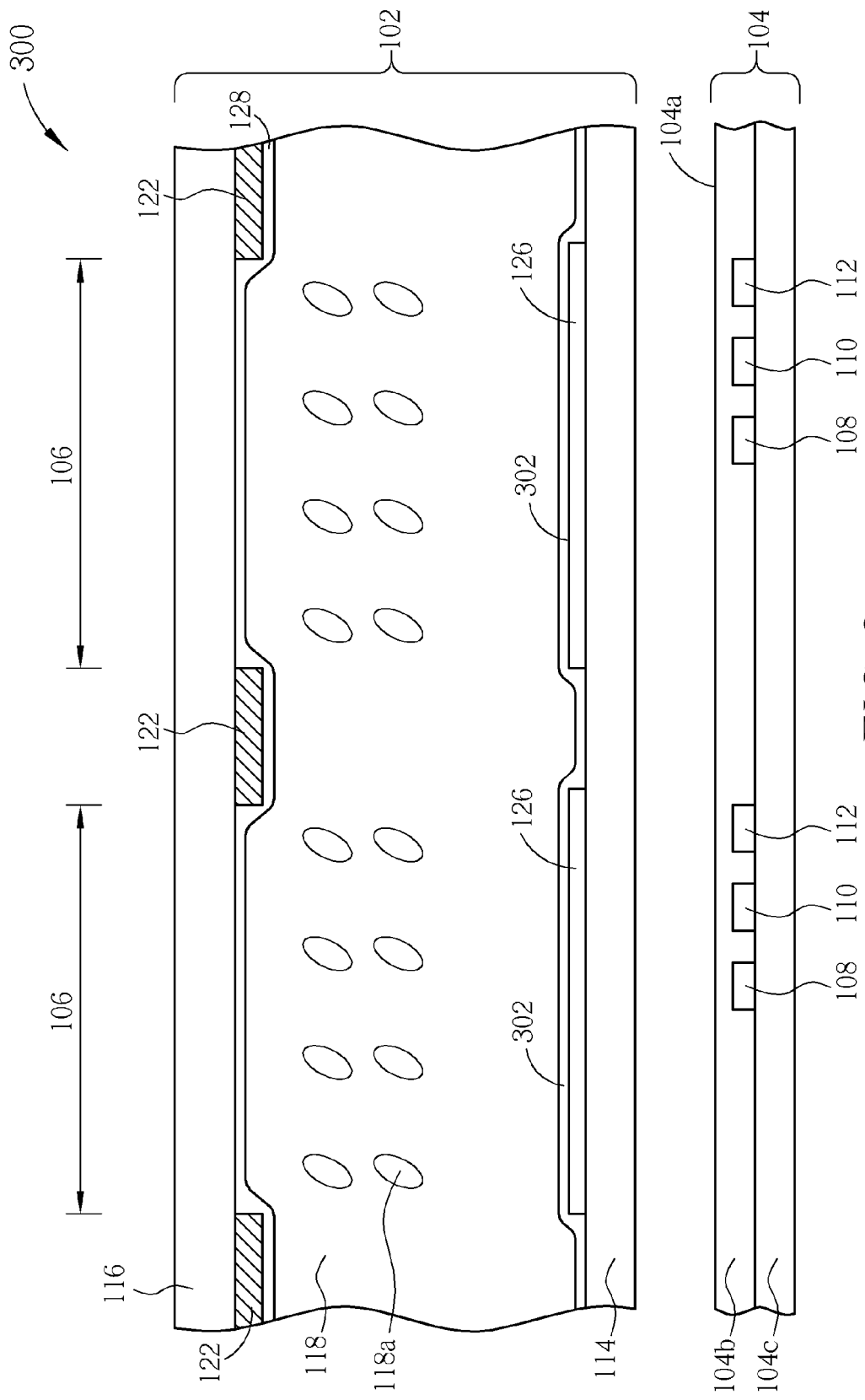
FIG. 3 is a schematic diagram illustrating a cross-sectional view of a liquid crystal display device according to a third preferred embodiment of the present invention.

The light absorption layer in the present invention is not limited to be disposed between the second substrate and the liquid crystal layer, and also could be disposed between the first substrate and the liquid crystal layer. Please refer to FIG. 3, which is a schematic diagram illustrating a cross-sectional view of a liquid crystal display device according to a third preferred embodiment of the present invention. As shown in FIG. 3, as compared with the first embodiment, the light absorption layer 302 in the liquid crystal display device 300 of this embodiment is disposed between the first substrate 114 and the liquid crystal layer 118, and covers the first substrate 114. In this embodiment, the light absorption layer 302 is disposed between the transparent electrodes 126 and the liquid crystal layer 118, but the present invention is not limited thereto, and also could be disposed between the transparent electrodes and the first substrate. In other embodiments of the present invention, the light absorption layer also could only cover the first substrate in each pixel region 106 or partially shield the first substrate in each pixel region. Furthermore, the light absorption layer could be composed of a stack of a plurality of color filters with different colors.

Figure 4:
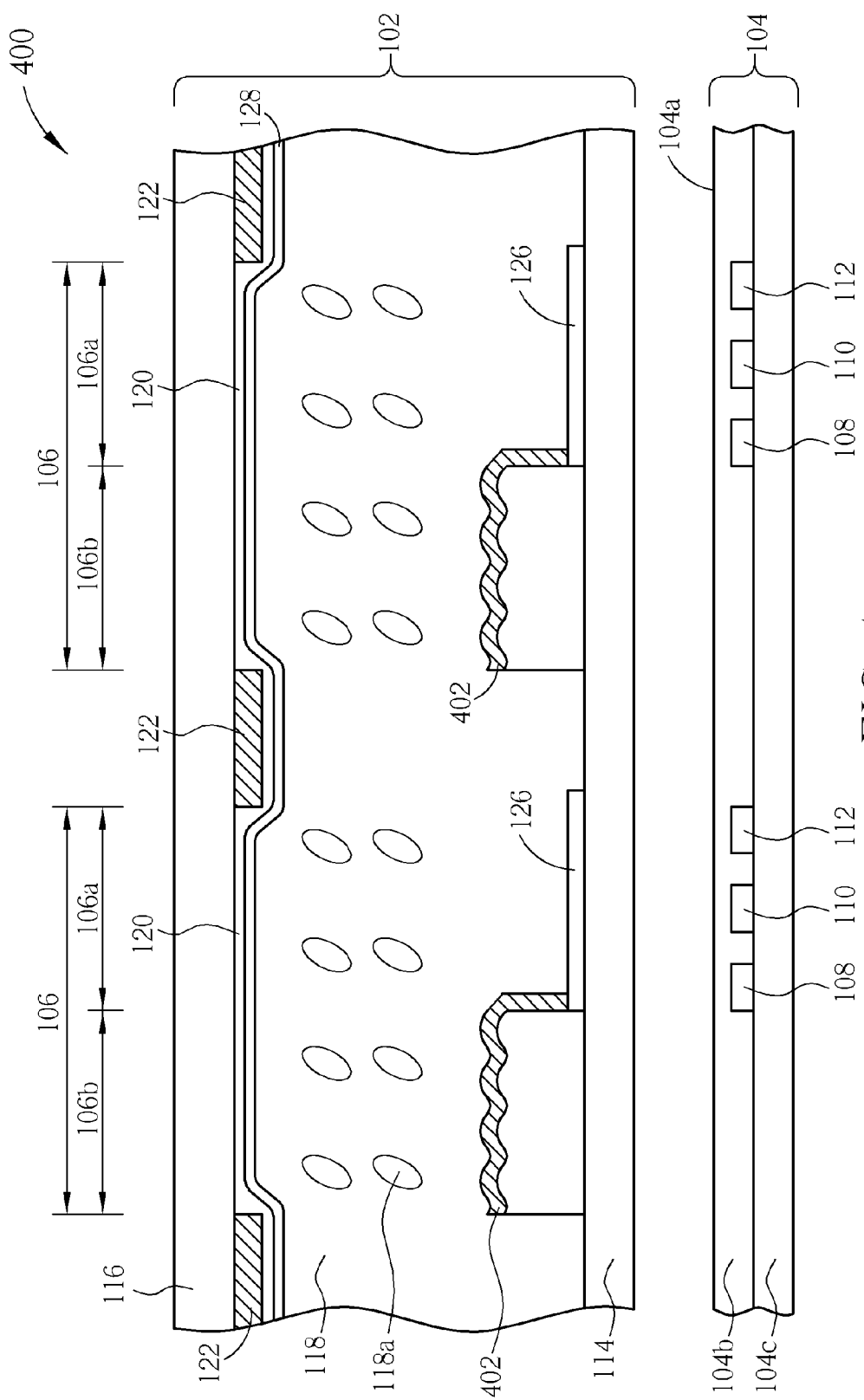
FIG. 4 is a schematic diagram illustrating a cross-sectional view of a liquid crystal display device according to a fourth preferred embodiment of the present invention.

The liquid crystal panel in the present invention is not limited to be a transmissive type liquid crystal panel, and also could be a transflective type liquid crystal panel. Please refer to FIG. 4, which is a schematic diagram illustrating a cross-sectional view of a liquid crystal display device according to a fourth preferred embodiment of the present invention. As shown in FIG. 4, as compared with the first embodiment, each pixel region 106 in the liquid crystal display device 400 of this embodiment has a transmissive region 106a and a reflective region 106b, and the liquid crystal panel 102 further includes a reflective electrode 402 disposed between the first substrate 114 and the liquid crystal layer 118 in the reflective region 106b. The transparent electrode 126 of this embodiment is disposed between the first substrate 114 and the liquid crystal layer 118 in the transmissive region 106a. Accordingly, the liquid crystal display device 400 of this embodiment could operate in a reflective mode when the timing control backlight module 104 is turned off so as to increase brightness of the frame displayed by the liquid crystal display device 400. In other embodiments of the present invention, the light absorption layer also could be disposed between the reflective electrode and the liquid crystal layer, and could further extend onto the transparent electrode.

In addition, the present invention is not limited to dispose the light absorption layer between the first substrate and the second substrate to reduce the color shift of the FSC liquid crystal display device, and could change a part of gray levels or turn on a part of light-emitting devices having apart of all colors to reduce the color shift. The method of changing a part of the gray levels could be controlling a part of the liquid crystal molecules in a part of the pixel regions to display in low gray levels when the liquid crystal display device operates in the reflective mode, so that the color shift in a viewing angle could be reduced by mixing gray levels in space domain. Or, the method of changing a part of the gray levels also could be setting up a comparison list corresponding to the reflective mode and displaying the frame with low color shift in the reflective mode or setting up a set of resistors that are electrically connected to pixel electrodes respectively and corresponds to the reflective mode to reduce the gray levels. Furthermore, the method of turning on the timing control backlight module could be turning on the light-emitting devices generating the light having a wavelength within a range between 380 nm and 560 nm to reduce the color shift. For example, the red light-emitting devices are turned on, or the red light-emitting devices and the blue light-emitting devices are turned on at the same time, so that the color of the frame generated by the liquid crystal display device could be compensated.

The following description further details the liquid crystal display device of the present invention having an effect of reducing color shift, and the liquid crystal display device in the first embodiment is taken as an example. Please refer to Table 1 and Table 2. Table 1 lists coordinate values in CIE 1960 uv coordinates of viewed frames respectively displayed by different liquid crystal display devices when viewing angle is 0 degree, and Table 2 lists coordinate values in CIE 1960 uv coordinates of viewed frames respectively displayed by different liquid crystal display devices when viewing angle is 30 degrees. A reference point represents coordinate values in CIE 1960 uv coordinates of a sunlight having a color temperature being 6500K. A condition 1 represents coordinate values of a viewed frame that is displayed by the liquid crystal display device without the light absorption layer, and has a gray level value being 0. A condition 2 represents coordinate values of a viewed frame that is displayed by the liquid crystal display device without the light absorption layer, and has a gray level value being 255. A condition 3 represents coordinate values of a viewed frame that is displayed by the liquid crystal display device having a red color filter disposed therein, and has a gray level value being 255. A condition 4 represents coordinate values of a viewed frame that is displayed by the liquid crystal display device having a stack of a red color filter and a blue color filter, and has a gray level value being 255. A condition 5 represents coordinate values of a viewed frame that is displayed by the liquid crystal display device turning on the red light-emitting devices, and has a gray level value being 255. A condition 6 represents coordinate values of a viewed frame that is displayed by the liquid crystal display device turning on the red light-emitting devices and the blue light-emitting devices simultaneously, and has a gray level value being 255. As shown in Table 1, when the viewing angle is 0 degree, a color shift value of condition 2 compared with the reference point is larger than a color shift value of the condition 3 compared with the reference point and a color shift value of the condition 4 compared with the reference point, and the color shift value of the condition 4 compared with the reference point is further smaller than 0.003. Accordingly, to dispose the red color filter in the liquid crystal display device could effectively reduce color shift, and the color shift of the liquid crystal display device could be further reduced by stacking up the red color filter and the blue color filter. Furthermore, the color shift value of the condition 5 compared with the reference point and the color shift value of the condition 6 compared with the reference point are smaller than the color shift value of condition 2 compared with reference point. Thus, the color of the frame displayed by the liquid crystal display device also could be compensated by turning on the red light-emitting devices or turning on the red light-emitting devices and the blue light-emitting devices simultaneously, and the color shift could be reduced. As shown in Table 2, when the viewing angle is 30 degrees, the color shift values of conditions 3, 4, 5, 6 compared with the reference point are less than the color shift value of the condition 2 compared with the reference point, and the color shift value of the conditions 4 and 6 compared with the reference point is further substantially equal to 0.003. Thus, to dispose the red color filter in the liquid crystal display device and to turn on the red light-emitting devices could effectively reduce color shift, and the color shift values of the liquid crystal display device could be further reduced to be 0.003 by stacking up the red color filter and the blue color filter and turning on the red light-emitting devices and the blue light-emitting devices simultaneously.

TABLE 1

|  | u coordinate value | v coordinate value | color shift value compared with reference point |
|---|---|---|---|
| Reference point | 0.198 | 0.312 |  |
| Condition 1 | 0.198 | 0.315 | 0.003 |
| Condition 2 | 0.184 | 0.320 | 0.015 |
| Condition 3 | 0.194 | 0.321 | 0.009 |
| Condition 4 | 0.197 | 0.311 | 0.002 |
| Condition 5 | 0.196 | 0.320 | 0.008 |
| Condition 6 | 0.195 | 0.310 | 0.003 |

TABLE 2

|  | u coordinate value | v coordinate value | color shift value compared with reference point |
|---|---|---|---|
| Reference point | 0.198 | 0.312 |  |
| Condition 1 | 0.195 | 0.318 | 0.007 |
| Condition 2 | 0.187 | 0.325 | 0.017 |
| Condition 3 | 0.198 | 0.328 | 0.014 |
| Condition 4 | 0.198 | 0.316 | 0.003 |
| Condition 5 | 0.198 | 0.326 | 0.014 |
| Condition 6 | 0.198 | 0.315 | 0.003 |

In summary, the color shift of the liquid crystal display device of the present invention could be effectively reduced when the liquid crystal display device operates in the reflective mode or the micro reflective mode through disposing the light absorption layer between the first substrate and the second substrate, changing a part of the gray levels, or turning on a part of light-emitting devices in the timing control backlight module.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A liquid crystal display device, comprising:
a liquid crystal panel, having a plurality of pixel regions, and the liquid crystal panel comprising:
a first substrate;
a second substrate, disposed opposite to the first substrate;
a liquid crystal layer, disposed between the first substrate and the second substrate; and
a light absorption layer, disposed between the first substrate and the second substrate in the pixel regions, and the light absorption layer covering all of the pixel regions and being configured to absorb a light having a wavelength within a range between 380 nm and 560 nm.

2. The liquid crystal display device according to claim 1, wherein the light absorption layer is disposed between the first substrate and the liquid crystal layer.

3. The liquid crystal display device according to claim 1, wherein the light absorption layer is disposed between the second substrate and the liquid crystal layer.

4. The liquid crystal display device according to claim 1, further comprising a timing control backlight module, configured to provide different color lights in different time periods according to a specific time sequence, and the first substrate being disposed between the timing control backlight module and the second substrate.

5. The liquid crystal display device according to claim 1, wherein each pixel region is a transmissive region.

6. The liquid crystal display device according to claim 1, wherein each pixel region has a transmissive region and a reflective region.

7. The liquid crystal display device according to claim 6, wherein the liquid crystal panel further comprises a plurality of reflective electrodes, and each reflective electrode being respectively disposed between the first substrate and the liquid crystal layer in each reflective region.

8. The liquid crystal display device according to claim 7, wherein the light absorption layer is disposed between the liquid crystal layer and the reflective electrodes.

9. The liquid crystal display device according to claim 1, wherein the light absorption layer is composed of a color filter with a color.

10. The liquid crystal display device according to claim 9, wherein the color is red.

11. The liquid crystal display device according to claim 1, wherein the light absorption layer comprises a first color filter with a first color, and a second color filter with a second color, and the first color filter and the second color filter are stacked between the first substrate and the second substrate.

12. The liquid crystal display device according to claim 11, wherein the first color is red, and the second color is blue.

13. The liquid crystal display device according to claim 1, wherein the liquid crystal panel further comprises a black matrix, disposed between the second substrate and the liquid crystal layer, and the light absorption layer extends to overlap the black matrix.

* * * * *